US010008071B2

(12) United States Patent
Powell et al.

(10) Patent No.: US 10,008,071 B2
(45) **Date of Patent: *Jun. 26, 2018**

(54) MULTI-PLAY CENTRAL DETERMINATION SYSTEM

(71) Applicant: IGT, Las Vegas, NV (US)

(72) Inventors: Tracy Powell, Reno, NV (US); Meng Oh, Reno, NV (US); Steven G. LeMay, Reno, NV (US); Wei Yang, Haidian District (CN); Eric Rasmussen, Reno, NV (US); Joshua Robinson, Reno, NV (US); Yu Chong, Reno, NV (US); Wensheng Liu, Reno, NV (US); Paul W. Bolton, Reno, NV (US); Nick Scheffel, Reno, NV (US)

(73) Assignee: IGT, Las Vegas, NV (US)

( * ) Notice: Subject to any disclaimer, the term of this patent is extended or adjusted under 35 U.S.C. 154(b) by 673 days.

This patent is subject to a terminal disclaimer.

(21) Appl. No.: 14/575,522

(22) Filed: Dec. 18, 2014

(65) Prior Publication Data

US 2015/0105143 A1 Apr. 16, 2015

Related U.S. Application Data

(63) Continuation of application No. 12/723,512, filed on Mar. 12, 2010, now Pat. No. 8,932,129.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2018.01) |
| ***G07F 17/32*** | (2006.01) |

(52) U.S. Cl.
CPC .......... *G07F 17/3244* (2013.01); *G07F 17/32* (2013.01)

(58) Field of Classification Search
CPC ............. G07F 17/3225; G07F 17/3232; G07F 17/3234; G07F 17/3241; G07F 17/3244
See application file for complete search history.

(56) References Cited

U.S. PATENT DOCUMENTS

| | | | |
|---|---|---|---|
| 2,228,180 | A | 1/1941 | Pauli |
| 2,474,573 | A | 6/1949 | Cohen |
| 3,589,729 | A | 6/1971 | Girard |

(Continued)

FOREIGN PATENT DOCUMENTS

| | | |
|---|---|---|
| WO | WO/1998/035309 | 8/1998 |
| WO | WO/2002/097749 | 12/2002 |

OTHER PUBLICATIONS

Third Party Submission for U.S. Appl. No. 12/723,512 dated Nov. 15, 2011.
U.S. Appl. No. 11/109,527, filed Apr. 18, 2005.

*Primary Examiner* — Milap Shah
*Assistant Examiner* — Jason Pinheiro
(74) *Attorney, Agent, or Firm* — Neal, Gerber & Eisenberg LLP

(57) ABSTRACT

Disclosed are methods, apparatus, and systems implementing techniques for using a central determination system with multi-play gaming machines having sub-games and with gaming machines having a base game and a bonus game. A seed value is provided for each of the games (i.e., each of the sub-games or the base game and the bonus game). This ensures that all possible game outcomes may be displayed for each of the games.

16 Claims, 13 Drawing Sheets

(56) References Cited

U.S. PATENT DOCUMENTS 3,628,259 A 12/1971 Kahn
4,156,976 A 6/1979 Mikun
4,157,829 A 6/1979 Goldman et al.
4,332,389 A 6/1982 Loyd et al.
4,335,809 A 6/1982 Wain
4,339,798 A 7/1982 Hedges et al.
4,365,810 A 12/1982 Richardson
4,373,726 A 2/1983 Churchill et al.
4,448,419 A 5/1984 Telnaes
4,455,025 A 6/1984 Itkis
4,467,424 A 8/1984 Hedges et al.
4,494,197 A 1/1985 Troy et al.
4,527,798 A 7/1985 Siekierski et al.
4,582,324 A 4/1986 Koza et al.
4,624,462 A 11/1986 Itkis
4,636,951 A 1/1987 Harlick
4,652,998 A 3/1987 Koza et al.
4,669,730 A 6/1987 Small
4,679,143 A 7/1987 Hagiwara
4,689,742 A 8/1987 Troy et al.
4,798,387 A 1/1989 Richardson
4,805,907 A 2/1989 Hagiwara
4,815,741 A 3/1989 Small
4,817,951 A 4/1989 Crouch et al.
4,842,278 A 6/1989 Markowicz
4,848,771 A 7/1989 Richardson
4,856,787 A 8/1989 Itkis
4,861,041 A 8/1989 Jones et al.
4,880,237 A 11/1989 Kishishita
4,882,473 A 11/1989 Bergeron et al.
4,982,337 A 1/1991 Burr et al.
5,007,649 A 4/1991 Richardson
5,011,159 A 4/1991 Fortunato et al.
5,042,809 A 8/1991 Richardson
5,042,818 A 8/1991 Weingardt
5,092,598 A 3/1992 Kamille
5,100,137 A 3/1992 Fulton
5,100,139 A 3/1992 Di Bella
5,118,109 A 6/1992 Gumina
5,119,295 A 6/1992 Kapur
5,154,429 A 10/1992 LeVasseur
5,158,293 A 10/1992 Mullins
5,165,693 A 11/1992 Handlon, Sr.
5,167,413 A 12/1992 Fulton
5,223,698 A 6/1993 Kapur
5,224,706 A 7/1993 Bridgeman et al.
5,265,874 A 11/1993 Dickinson et al.
5,265,882 A 11/1993 Malek
5,275,400 A 1/1994 Weingardt et al.
5,276,312 A 1/1994 McCarthy
5,280,915 A 1/1994 Grossman
5,282,620 A 2/1994 Keesee
5,288,081 A 2/1994 Breeding
5,294,120 A 3/1994 Schultz
5,294,128 A 3/1994 Marquez
5,297,802 A 3/1994 Pocock et al.
5,303,929 A 4/1994 Sandeen
5,320,356 A 6/1994 Cauda
5,324,035 A 6/1994 Morris et al.
5,326,104 A 7/1994 Pease et al.
5,328,189 A 7/1994 Malek
5,332,219 A 7/1994 Marnell et al.
5,348,299 A 9/1994 Clapper, Jr.
5,351,970 A 10/1994 Fioretti
5,356,140 A 10/1994 Dabrowski et al.
5,377,975 A 1/1995 Clapper, Jr.
5,377,993 A 1/1995 Josephs
5,393,061 A 2/1995 Manship et al.
5,398,932 A 3/1995 Eberhardt et al.
5,401,023 A 3/1995 Wood
5,407,199 A 4/1995 Gumina
5,417,430 A 5/1995 Breeding
5,452,899 A 9/1995 Skratulia et al.
5,476,259 A 12/1995 Weingardt
5,486,005 A 1/1996 Neal
5,487,544 A 1/1996 Clapper, Jr.
5,489,101 A 2/1996 Moody
5,496,038 A 3/1996 Kangsanaraks
5,511,781 A 4/1996 Wood et al.
5,531,448 A 7/1996 Moody
5,536,008 A 7/1996 Clapper, Jr.
5,542,669 A 8/1996 Charron et al.
5,544,892 A 8/1996 Breeding
5,562,284 A 10/1996 Stevens
5,564,701 A 10/1996 Dettor
5,570,885 A 11/1996 Ornstein
5,573,249 A 11/1996 Johnson
5,577,731 A 11/1996 Jones
5,580,053 A 12/1996 Crouch
5,580,311 A 12/1996 Haste, III
5,584,486 A 12/1996 Franklin
5,586,937 A 12/1996 Menashe
5,593,161 A 1/1997 Boylan et al.
5,595,538 A 1/1997 Haste, III
5,609,337 A 3/1997 Clapper, Jr.
5,628,684 A 5/1997 Boudec
5,630,754 A 5/1997 Rebane
5,639,092 A 6/1997 Macaisa
5,645,485 A 7/1997 Clapper, Jr.
5,657,899 A 8/1997 Stoken
5,664,781 A 9/1997 Feola
5,674,128 A 10/1997 Holch et al.
5,678,001 A 10/1997 Nagel et al.
5,697,843 A 12/1997 Manship et al.
5,707,285 A 1/1998 Place et al.
5,711,715 A 1/1998 Ringo et al.
5,718,431 A 2/1998 Ornstein
5,720,483 A 2/1998 Trinh
5,722,891 A 3/1998 Inoue
5,725,428 A 3/1998 Achmuller
5,732,950 A 3/1998 Moody
5,735,432 A 4/1998 Stoken et al.
5,743,530 A 4/1998 Sklad et al.
5,749,784 A 5/1998 Clapper, Jr.
5,775,692 A 7/1998 Watts et al.
5,779,545 A 7/1998 Berg et al.
5,779,547 A 7/1998 SoRelle et al.
5,791,987 A 8/1998 Chen et al.
5,800,269 A 9/1998 Holch et al.
5,810,664 A 9/1998 Clapper, Jr.
5,813,911 A 9/1998 Margolin
5,816,915 A 10/1998 Kadlic
5,816,916 A 10/1998 Moody
5,823,873 A 10/1998 Moody
5,823,874 A 10/1998 Adams
5,830,067 A 11/1998 Graves et al.
5,848,932 A 12/1998 Adams
5,855,515 A 1/1999 Pease et al.
5,868,618 A 2/1999 Netley et al.
5,868,619 A 2/1999 Wood et al.
5,871,398 A 2/1999 Schneier et al.
5,876,283 A 3/1999 Parra et al.
5,879,233 A 3/1999 Stupero
5,882,258 A 3/1999 Kelly et al.
5,882,259 A 3/1999 Holmes, Jr. et al.
5,882,260 A 3/1999 Marks et al.
5,909,875 A 6/1999 Weingardt
5,915,588 A 6/1999 Stoken et al.
5,928,082 A 7/1999 Clapper, Jr.
5,934,675 A 8/1999 Handelman et al.
5,941,771 A 8/1999 Haste, III
5,944,606 A 8/1999 Gerow
5,949,042 A 9/1999 Dietz, II et al.
5,954,335 A 9/1999 Moody
5,954,582 A 9/1999 Zach
5,970,143 A 10/1999 Schneier et al.
5,976,016 A 11/1999 Moody et al.
5,980,385 A 11/1999 Clapper, Jr.
5,984,779 A 11/1999 Bridgeman et al.
5,996,997 A 12/1999 Kamille
6,007,066 A 12/1999 Moody
6,007,424 A 12/1999 Evers et al.
6,012,720 A 1/2000 Webb
6,012,981 A 1/2000 Fujioka et al.

(56) References Cited

U.S. PATENT DOCUMENTS 6,012,984 A 1/2000 Roseman
6,017,032 A 1/2000 Grippo et al.
6,024,640 A 2/2000 Walker et al.
6,030,288 A 2/2000 Davis et al.
6,045,129 A 4/2000 Cooper et al.
6,050,568 A 4/2000 Hachquet
6,056,289 A 5/2000 Clapper, Jr.
6,062,980 A 5/2000 Luciano
6,062,981 A 5/2000 Luciano, Jr.
6,079,710 A 6/2000 Brown
6,079,711 A 6/2000 Wei et al.
6,089,982 A 7/2000 Holch et al.
6,089,985 A 7/2000 Morath et al.
6,093,100 A 7/2000 Singer et al.
6,098,985 A 8/2000 Moody
6,099,408 A 8/2000 Schneier et al.
6,102,400 A 8/2000 Scott et al.
6,117,009 A 9/2000 Yoseloff
6,120,024 A 9/2000 Lind
6,120,378 A 9/2000 Moody et al.
6,126,541 A 10/2000 Fuchs
6,126,542 A 10/2000 Fier
6,132,311 A 10/2000 Williams
6,135,882 A 10/2000 Kadlic
6,135,883 A 10/2000 Hachquet
6,146,271 A 11/2000 Kadlic
6,146,272 A 11/2000 Walker et al.
6,149,156 A 11/2000 Feola
6,149,521 A 11/2000 Sanduski
6,155,925 A 12/2000 Giobbi et al.
6,159,095 A 12/2000 Frohm et al.
6,168,521 B1 1/2001 Luciano et al.
6,174,233 B1 1/2001 Sunaga et al.
6,176,781 B1 1/2001 Walker et al.
6,183,361 B1 2/2001 Cummings et al.
6,190,255 B1 2/2001 Thomas et al.
6,196,547 B1 3/2001 Pascal et al.
6,203,429 B1 3/2001 Demar et al.
6,210,275 B1 4/2001 Olsen
6,210,276 B1 4/2001 Mullins
6,217,448 B1 4/2001 Olsen
6,220,961 B1 4/2001 Keane et al.
6,241,606 B1 6/2001 Riendeau et al.
6,250,685 B1 6/2001 Walker et al.
6,254,480 B1 7/2001 Zach
6,273,820 B1 8/2001 Haste, III
6,280,325 B1 8/2001 Fisk
6,280,328 B1 8/2001 Holch et al.
6,302,791 B1 10/2001 Frohm et al.
6,306,038 B1 10/2001 Graves et al.
6,309,298 B1 10/2001 Gerow
6,311,978 B1 11/2001 Moody
6,312,334 B1 11/2001 Yoseloff
6,315,289 B1 11/2001 Sakamoto et al.
6,315,291 B1 11/2001 Moody
6,325,716 B1 12/2001 Walker et al.
6,334,613 B1 1/2002 Yoseloff
6,358,150 B1 3/2002 Mir et al.
6,358,151 B1 3/2002 Enzminger et al.
6,364,313 B1 4/2002 Moody
6,368,218 B2 4/2002 Angell, Jr.
6,386,977 B1 5/2002 Hole
6,402,614 B1 6/2002 Schneier et al.
6,419,578 B1 7/2002 Moody et al.
6,419,583 B1 7/2002 Crumby et al.
6,425,824 B1 7/2002 Baerlocher et al.
6,443,837 B1 9/2002 Jaffe et al.
6,447,395 B1 9/2002 Stevens
6,450,885 B2 9/2002 Schneier et al.
6,454,648 B1 9/2002 Kelly et al.
6,454,649 B1 9/2002 Mattice et al.
6,471,591 B1 10/2002 Crumby
6,475,086 B2 11/2002 Zach
6,508,711 B1 1/2003 Ono
6,517,074 B1 2/2003 Moody
6,524,184 B1 2/2003 Lind et al.
6,524,185 B2 2/2003 Lind
6,527,638 B1 3/2003 Walker et al.
6,533,664 B1 3/2003 Crumby
6,537,150 B1 3/2003 Luciano et al.
6,561,898 B2 5/2003 Moody
6,568,680 B1 5/2003 Moody et al.
6,569,017 B2 5/2003 Enzminger et al.
6,599,187 B2 7/2003 Gerow
6,607,439 B2 8/2003 Schneier et al.
6,609,974 B2 8/2003 Mead et al.
6,612,927 B1 9/2003 Slomiany et al.
6,619,660 B2 9/2003 Schaefer et al.
6,652,377 B1 11/2003 Moody
6,652,378 B2 11/2003 Cannon et al.
6,656,040 B1 12/2003 Brosnan et al.
6,656,044 B1 12/2003 Lewis
6,672,959 B2 1/2004 Moody et al.
6,676,126 B1 1/2004 Walker et al.
6,685,562 B1 2/2004 Rantanen
6,695,695 B2 2/2004 Angel
6,729,961 B1 5/2004 Millerschone
6,733,385 B1 5/2004 Enzminger et al.
6,749,500 B1 6/2004 Nelson et al.
6,749,510 B2 6/2004 Giobbi
6,866,584 B2 3/2005 Michaelson
6,899,622 B2 5/2005 Lind et al.
6,964,418 B2 11/2005 Moody
6,988,946 B2 1/2006 Michaelson et al.
7,156,735 B2 * 1/2007 Brosnan .............. G07F 17/3262
273/121 B
7,186,180 B2 3/2007 Lathrop et al.
7,192,348 B2 3/2007 Brosnan et al.
7,291,069 B2 11/2007 Michaelson et al.
7,329,183 B2 2/2008 Michaelson et al.
7,399,227 B2 7/2008 Michaelson et al.
7,470,183 B2 12/2008 Wishart
7,524,243 B2 4/2009 Bansemer et al.
7,563,163 B2 * 7/2009 Crumby .............. G07F 17/3244
463/16
7,628,703 B2 12/2009 Wolf et al.
7,658,672 B1 2/2010 Wolf et al.
7,775,875 B2 * 8/2010 Nguyen .................. G07F 17/32
463/16
7,815,500 B2 10/2010 Montross et al.
7,833,093 B2 11/2010 Michaelson et al.
7,837,545 B2 11/2010 Blair, Jr. et al.
7,857,693 B1 12/2010 Johnson et al.
2002/0010013 A1 1/2002 Walker et al.
2002/0039917 A1 4/2002 Armstrong et al.
2002/0072404 A1 6/2002 Gerow
2002/0077173 A1 6/2002 Luciano et al.
2002/0077174 A1 6/2002 Luciano et al.
2002/0082070 A1 6/2002 Macke et al.
2002/0082071 A1 6/2002 Riendeau et al.
2002/0082085 A1 6/2002 Osterer
2002/0090986 A1 7/2002 Cote et al.
2002/0094871 A1 7/2002 Luciano, Jr. et al.
2002/0098882 A1 7/2002 Lind et al.
2002/0098883 A1 7/2002 Packes, Jr. et al.
2002/0111207 A1 8/2002 Lind et al.
2002/0111214 A1 8/2002 Clifton et al.
2002/0113369 A1 8/2002 Weingardt
2002/0132661 A1 9/2002 Lind et al.
2002/0132666 A1 9/2002 Lind et al.
2002/0169018 A1 11/2002 Schneier et al.
2002/0196342 A1 12/2002 Walker et al.
2003/0060257 A1 3/2003 Katz et al.
2003/0060261 A1 3/2003 Katz et al.
2003/0060276 A1 3/2003 Walker et al.
2003/0100371 A1 5/2003 Gatto et al.
2003/0100372 A1 5/2003 Gatto et al.
2003/0125101 A1 7/2003 Campo
2003/0134670 A1 7/2003 Kilby
2003/0181231 A1 9/2003 Vancura et al.
2003/0190943 A1 10/2003 Walker et al.
2003/0193136 A1 10/2003 Walker et al.
2003/0211884 A1 11/2003 Gauselmann
2004/0014515 A1 1/2004 Tracy et al.

(56) References Cited

U.S. PATENT DOCUMENTS

| | | | |
|---|---|---|---|
| 2004/0036212 A1 | 2/2004 | Walker et al. | |
| 2004/0038723 A1 | 2/2004 | Schneier et al. | |
| 2004/0063483 A1 | 4/2004 | Wolf et al. | |
| 2004/0137987 A1* | 7/2004 | Nguyen .................. | G07F 17/32 463/42 |
| 2004/0166919 A1 | 8/2004 | Duhamel et al. | |
| 2005/0156428 A1 | 7/2005 | Lind et al. | |
| 2006/0166725 A1 | 7/2006 | Saffari et al. | |
| 2006/0172791 A1 | 8/2006 | Wolf | |
| 2007/0135209 A1 | 6/2007 | Lind et al. | |
| 2008/0026808 A1 | 1/2008 | Yoshizawa | |
| 2008/0026834 A1 | 1/2008 | Yoshizawa | |
| 2011/0003627 A1 | 1/2011 | Nicely et al. | |

* cited by examiner

MULTI-PLAY CENTRAL DETERMINATION SYSTEM

PRIORITY CLAIM

This application is a continuation application of, claims priority to and the benefit of U.S. patent application Ser. No. 12/723,512, filed on Mar. 12, 2010, the entire contents of which is incorporated by reference herein.

TECHNICAL FIELD

The present invention relates generally to gaming devices and systems, and more specifically to gaming devices and multi-play gaming devices in a central determination gaming system.

BACKGROUND

It is useful to briefly describe the classes of gaming in the United States and how these classes may be implemented in a gaming network. Gaming in the United States is divided into Class I, Class II, and Class III games. Class I gaming includes social games played for minimal prizes and traditional ceremonial games. Class II gaming includes bingo and bingo-like games, such as pulltab games. Bingo includes games played for prizes, including monetary prizes, with cards bearing numbers or other designations in which the holder of the cards covers such numbers or designations when objects, similarly numbered or designated, are drawn or electronically determined, and in which the game is won by the first person covering a previously designated arrangement of numbers or designations on such cards. Class II gaming may also include pulltab games if played in the same location as bingo games, lotto, punch boards, tip jars, instant bingo, and other games similar to bingo. Class III gaming includes any games that are not Class I or Class II games, such as games of chance typically offered in non-Indian, state-regulated casinos. Many games of chance that are played on gaming terminals fall into the Class II and Class III categories of games.

Central determination gaming refers to any gaming method or system in which a central computer (a central determination system, or CDS) determines game outcomes for a group of players. Most conventional central determination systems are used for Class II gaming. In central determination gaming, players compete for a central pool of prizes. The prizes may include progressive prizes or progressive bonuses. This pool of prizes is finite, making central determination gaming similar to a lottery game. For example, an electronic game may be implemented as a central determination game, in which a number of gaming terminals are in communication with the central computer. The central computer selects games outcomes from a finite pool of outcomes to determine the prize that a player at a gaming terminal wins. The game outcome is displayed on the gaming terminals' display screens. Central determination gaming is most prevalent in New York and Washington state. Central determination gaming is described further in U.S. patent application Ser. No. 11/109,527, filed Apr. 18, 2005, which is herein incorporated by reference in pertinent part.

SUMMARY

Disclosed are methods, apparatus, and systems implementing techniques for using a central determination system with multi-play gaming machines having sub-games and with gaming machines having a base game and a bonus game. A multi-play gaming machine is a gaming machine that gives players the option of playing multiple sub-games simultaneously.

According to one embodiment, a central determination gaming system includes a number of gaming machines, including a number of multi-play gaming machines, and a server configured to communicate with the gaming machines. Each multi-play gaming machine includes a controller configured to output one or more sub-games. Each sub-game includes a single instance of a wager-based game of chance. Each multi-play gaming machine also includes a display configured to display the one or more sub-games and an input device configured to accept bet information for playing the one or more sub-games. The server, for each multi-play gaming machine, is configured to: (a) receive bet information from the multi-play gaming machine; (b) identify, based on the bet information, one of a number of pool files from which to select a game outcome register, each pool file including a number of game outcome registers, each game outcome register including one or more sub-game outcomes, each sub-game outcome including a sub-game payout and a seed value; (c) select the pool file from which to select the game outcome register; (d) randomly select a game outcome register from the selected pool file; and, (e) transmit the selected game outcome register to the multi-play gaming machine. The controller of each multi-play gaming machine is further configured to receive the selected game outcome register from the server and to determine a sub-game output to be displayed for each sub-game in the selected game outcome register using the seed value in each sub-game outcome.

According to another embodiment, a central determination gaming system includes a number of gaming machines, including a number of multi-play gaming machines, and a server configured to communicate with the gaming machines. Each multi-play gaming machine includes a controller configured to output one or more sub-games. Each sub-game includes a single instance of a wager-based game of chance. Each multi-play gaming machine also includes a display configured to display the one or more sub-games and an input device configured to accept bet information for playing the one or more sub-games. The server, for each multi-play gaming machine, is configured to: (a) receive bet information from the multi-play gaming machine; (b) identify, based on the bet information, one of a number of pool files from which to select a game outcome register, each pool file including a number of game outcome registers, each game outcome register including a payout; (c) select the pool file from which to select a game outcome register; (d) randomly select a game outcome register from the selected pool file; and, (e) transmit the selected game outcome register to the multi-play gaming machine. The controller of each multi-play gaming machine is further configured to: (a) receive the selected game outcome register from the server; (b) select, based on a number of the one or more sub-games being played, one of a number of outcome lookup files, each outcome lookup file including a number of outcome distributions; (c) randomly select an outcome distribution from the selected outcome lookup file, the outcome distribution specifying how the payout is allocated into sub-game payouts, each sub-game payout associated with each of the one or more sub-games being played; (d) select, based on the sub-game payout for each of the one or more sub-games for which the sub-game payout is not zero, as specified by the outcome distribution, one of a number of seed files, each seed file including a number of seed values; (e) randomly select, for each of the one or more sub-games for which the sub-game payout is not zero, one of a number of seed values from the selected seed file; and, (f) determine, for each of the one or more sub-games for which the sub-game payout is not zero, the sub-game output to be displayed on the multi-play gaming machine for each sub-game using the selected seed values.

According to another embodiment, a first game and a second game are presented on a gaming machine connected to one or more servers over a network. To present the first and second games on the gaming machine, the gaming machine: (a) receives bet information at an input device of the gaming machine; (b) transmits the bet information to a server in communication with the gaming machine; (c) receives, from the server, a game outcome register, the game outcome register randomly selected from one of a number of pool files accessible by the server; (d) determines a first game output to be displayed on the gaming machine for the first game using a first seed value; and, (e) determines a second game output to be displayed on the gaming machine for the second game using a second seed value. Each pool file includes a number of game outcome registers. The server selects one pool file based on the bet information. The game outcome register includes a first payout and associated first seed value and a second payout and associated second seed value.

BRIEF DESCRIPTION OF THE DRAWINGS

The included drawings are for illustrative purposes and serve only to provide examples of possible structures and process steps for the disclosed inventive systems and methods for gaming machines and multi-play gaming machines in a central determination gaming system. These drawings in no way limit any changes in form and detail that may be made to the invention by one skilled in the art without departing from the spirit and scope of the present invention.

DETAILED DESCRIPTION

Exemplary applications of systems and methods according to embodiments of the present invention are described in this section. These examples are being provided solely to add context and aid in the understanding of embodiments of the present invention. It will thus be apparent to one skilled in the art that the invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

Although the present invention is directed primarily to gaming machines and systems, it is worth noting that some of the apparatuses, systems and methods disclosed herein might be adaptable for use in other types of devices, systems or environments, as applicable, such that their use is not restricted exclusively to gaming machines and contexts. Such other adaptations may become readily apparent upon review of the inventive apparatuses, systems and methods illustrated and discussed herein.

Figure 1A:
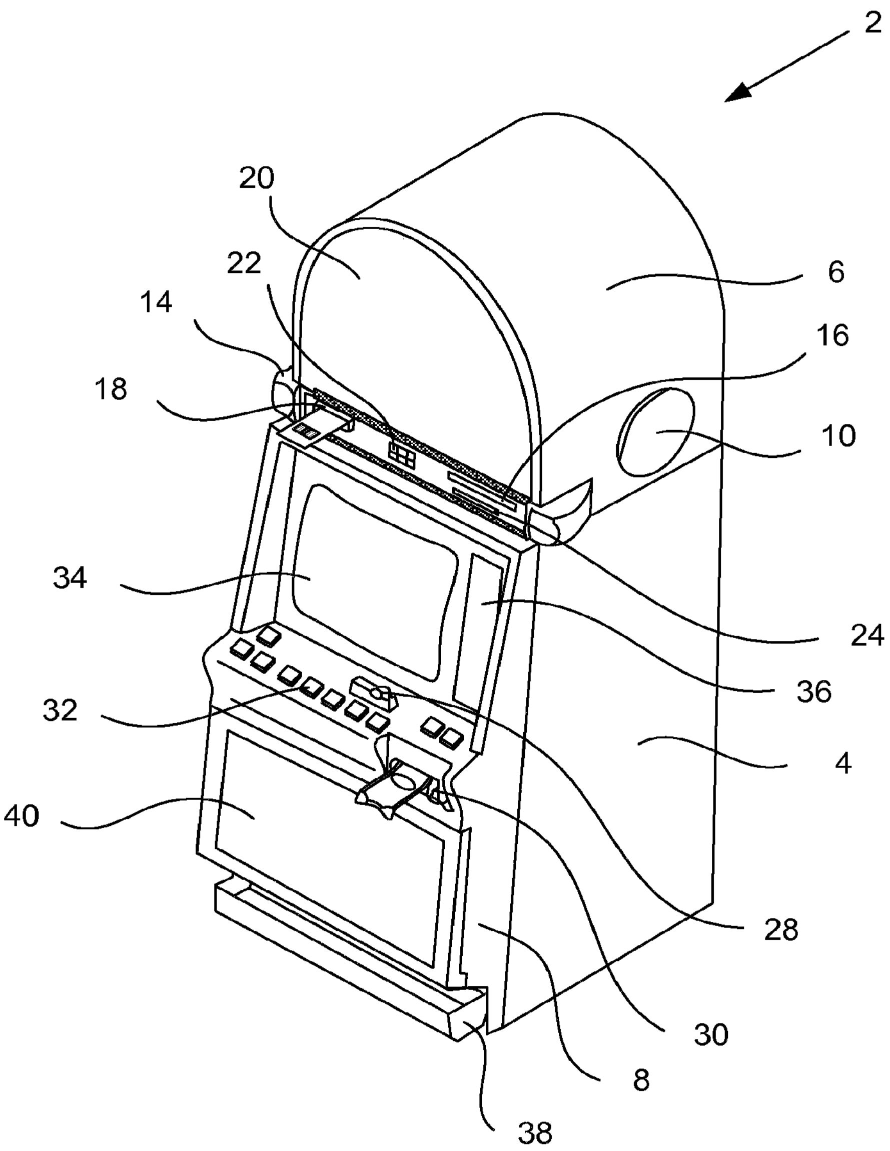
FIGS. 1A-B are views of an exemplary gaming machine.

FIG. 1A is an exemplary gaming machine 2 illustrated in perspective view. Gaming machine 2 includes a top box 6 and a main cabinet 4, which generally surrounds the machine interior (not shown) and is viewable by users, such as administrators, casino operators, and game players. This top box and/or main cabinet can together or separately form an exterior housing adapted to contain a plurality of internal gaming machine components therein. Main cabinet 4 includes a main door 8 on the front of the gaming machine, which preferably opens to provide access to the gaming machine interior. Attached to a panel of the main door 8 are typically one or more player-input devices 32, one or more money or credit acceptors, such as a coin acceptor 28 and a bill or ticket validator 30, a coin tray 38, and a belly glass 40. Player-input device 32 traditionally includes a button panel with physical buttons. Player-input device 32 may alternatively include a touch screen display or a touch screen display with associated physical buttons. Viewable through main door 8 is a main video display monitor 34 adapted to present a game, such as a game of chance or a game of skill, and one or more information panels 36. The main video display monitor 34 will typically be a cathode ray tube, high resolution flat-panel liquid crystal display (LCD), plasma/light emitting diode (LED) display or other conventional or other type of appropriate video monitor. Alternatively, a plurality of gaming reels can be used as a main gaming machine display in place of display monitor 34, with such gaming reels preferably being electronically controlled, as will be readily appreciated by one skilled in the art.

Top box 6, which typically rests atop of the main cabinet 4, may contain a ticket dispenser 18, a key pad 22, one or more additional displays 16, a card reader 24, one or more speakers 10, and a top glass 20. It will be understood that many makes, models, types and varieties of gaming machines exist, that not every such gaming machine will include all or any of the foregoing items, and that many gaming machines will include other items not described above. It will also be understood that some multi-play gaming machines are similar to the gaming machine illustrated in FIG. 1A with the possible exceptions of information displayed on the main video display monitor and/or the player input device. Embodiments disclosed herein are applicable to both gaming machines and multi-play gaming machines. Multi-play gaming machines are described further, herein.

Figure 1B:
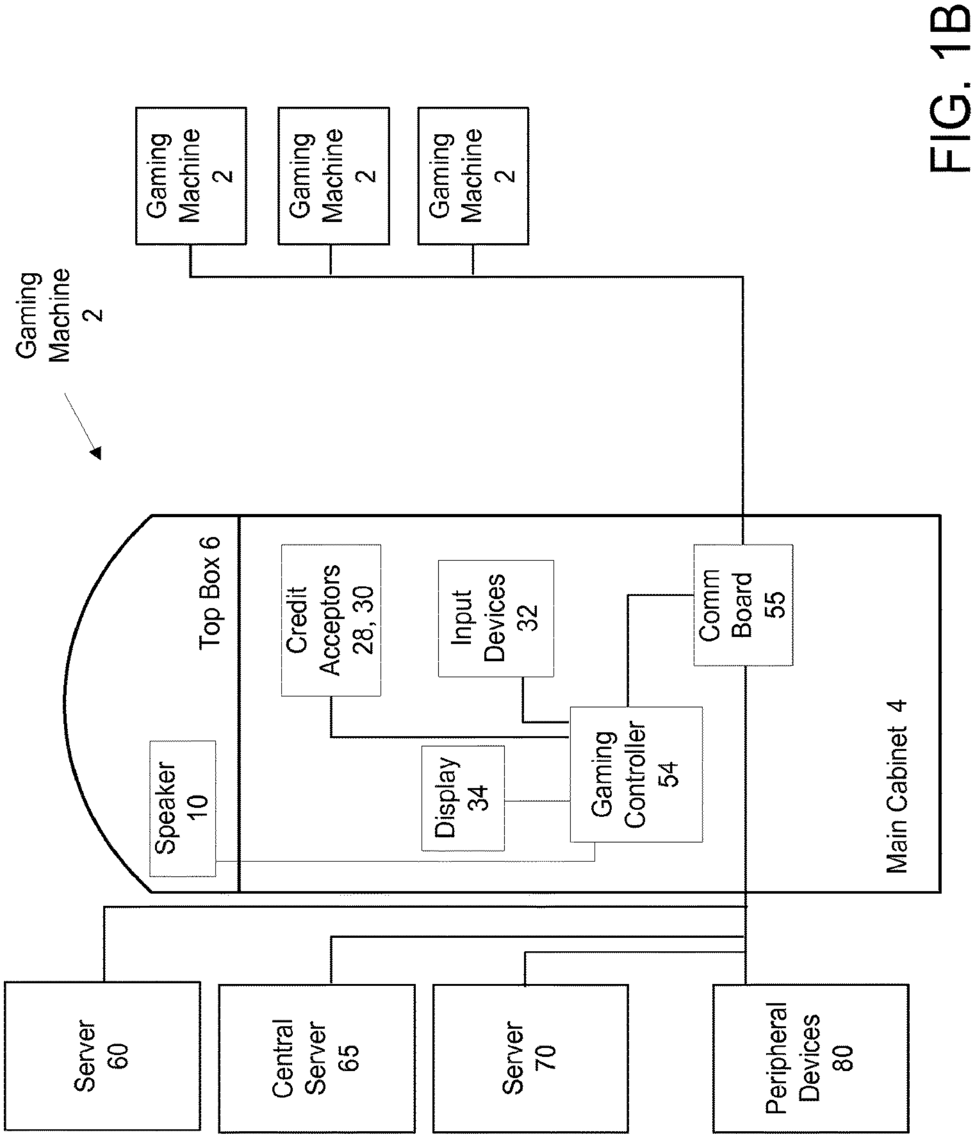

FIG. 1B is a block diagram of the interior of gaming machine 2, showing the internal gaming machine components and the connections with a number of the components shown in FIG. 1A. In gaming machine 2, gaming controller 54 controls the operation of the gaming machine. Gaming controller 54 is connected to player input devices 32, credit acceptors (28, 30), main video display monitor 34, and one or more speakers 10. Gaming controller 54 receives input and/or provides output to these components. Gaming controller 54 communicates with central server 65 that provides game outcomes to gaming controller 54 for a gaming machine that is part of a central determination gaming system. Gaming controller 54 may also communicate with server 60, server 70, a sub-network of peripheral devices 80, and other gaming machines 2 via the communication board 55. Server 60, central server 65, server 70, and the sub-network of peripheral devices 80 are described further herein.

With respect to the basic gaming abilities provided, it will be readily understood that gaming machine 2 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. Other features and functions may also be used in association with gaming machine 2, and it is specifically contemplated that the present invention can be used in conjunction with such a gaming machine or device that might encompass any or all such additional types of features and functions.

With respect to electronic gaming machines in particular, the electronic gaming machines made by IGT, Inc. are provided with special features and additional circuitry that differentiate them from general-purpose computers, such as a laptop or desktop personal computer ("PC"). Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment.

Although the variety of devices available for a PC may be greater than on a gaming machine, gaming machines still have unique device requirements that differ from a PC, such as device security requirements not usually addressed by PCs. For instance, monetary devices such as coin dispensers, bill validators, ticket printers and computing devices that are used to govern the input and output of cash to a gaming machine have security requirements that are not typically addressed in PCs. Many PC techniques and methods developed to facilitate device connectivity and device compatibility do not address the emphasis placed on security in the gaming industry. To address some of these issues, a number of hardware/software components and architectures are utilized in gaming machines that are not typically found in general-purpose computing devices, such as PCs. These hardware/software components and architectures include, but are not limited to, items such as watchdog timers, voltage monitoring systems, state-based software architectures and supporting hardware, specialized communication interfaces, security monitoring, and trusted memory.

Figure 2:
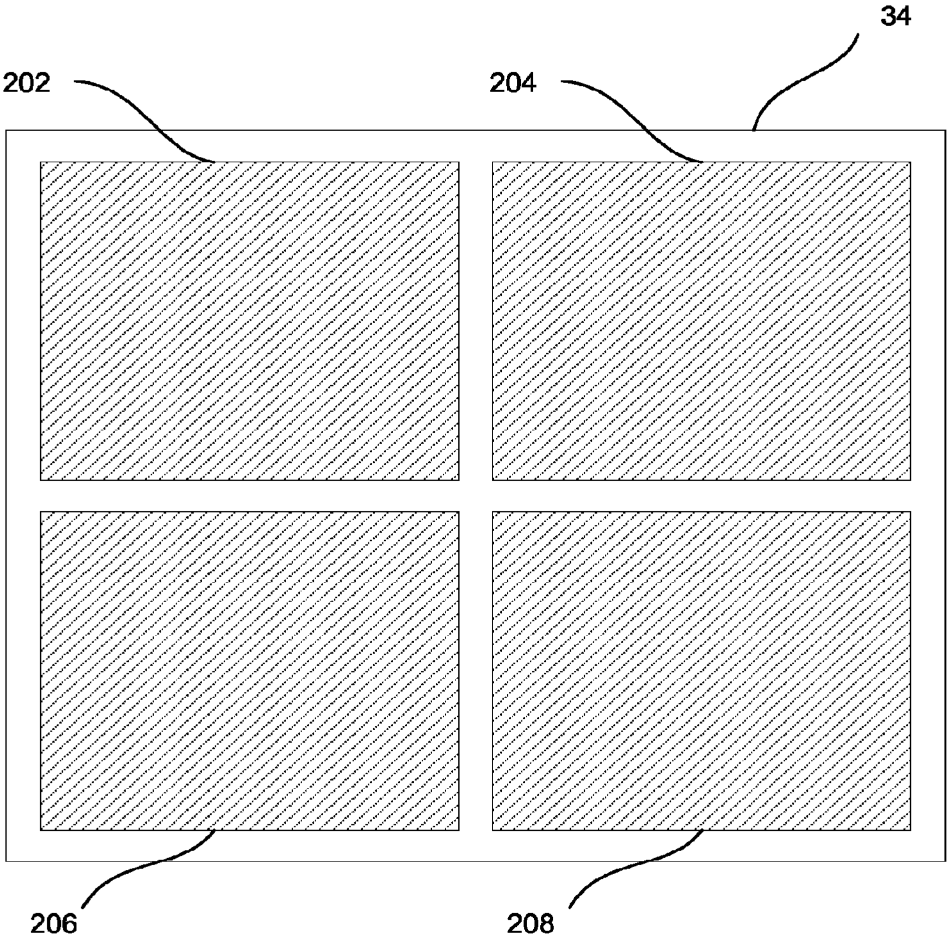
FIG. 2 is a diagram of an exemplary display of a multi-play gaming machine.

As noted herein, a multi-play gaming machine is a type of gaming machine. Multi-play gaming machines are similar to more conventional gaming machines that are configured to display a single game at a time, but with some important differences. FIG. 2 is a diagram of an exemplary display of a multi-play gaming machine. In this embodiment of a display a multi-play gaming machine, the display shows four sub-game windows, 202, 204, 206, and 208. Each sub-game window is configured to display the outcome of a sub-game. When playing games on multi-play gaming machine, a player may play one, two, three, or four sub-games (in this embodiment) simultaneously. That is, one, two, three, or four sub-games may be played in one gaming transaction, for example, by pressing a single input/wager button on the multi-play gaming machine. For example, a player may choose to place a wager in a single game transaction on two sub-games, with sub-game outcomes being displayed in sub-game windows 202 and 204. Stated in a different manner, a player may choose to place a wager on one sub-game and a wager on anther sub-game in one game transaction. Alternatively, the player may choose to place a wager in a single game transaction on four sub-games, with sub-game outcomes being displayed in sub-game windows 202, 204, 206, and 208. In gaming machines that are not multi-play gaming machines, a single game is typically shown on the display and played by the player.

It will be understood that many different configurations for displaying sub-game windows on a multi-game display are possible. For example, two, three, four, five, or six sub-games may be displayed. The sub-games may be arranged from top to bottom on the display or from left to right across the display. Multi-play gaming machines are further described in U.S. Pat. No. 6,652,378, which is herein incorporated by reference in pertinent part.

Figure 3A:
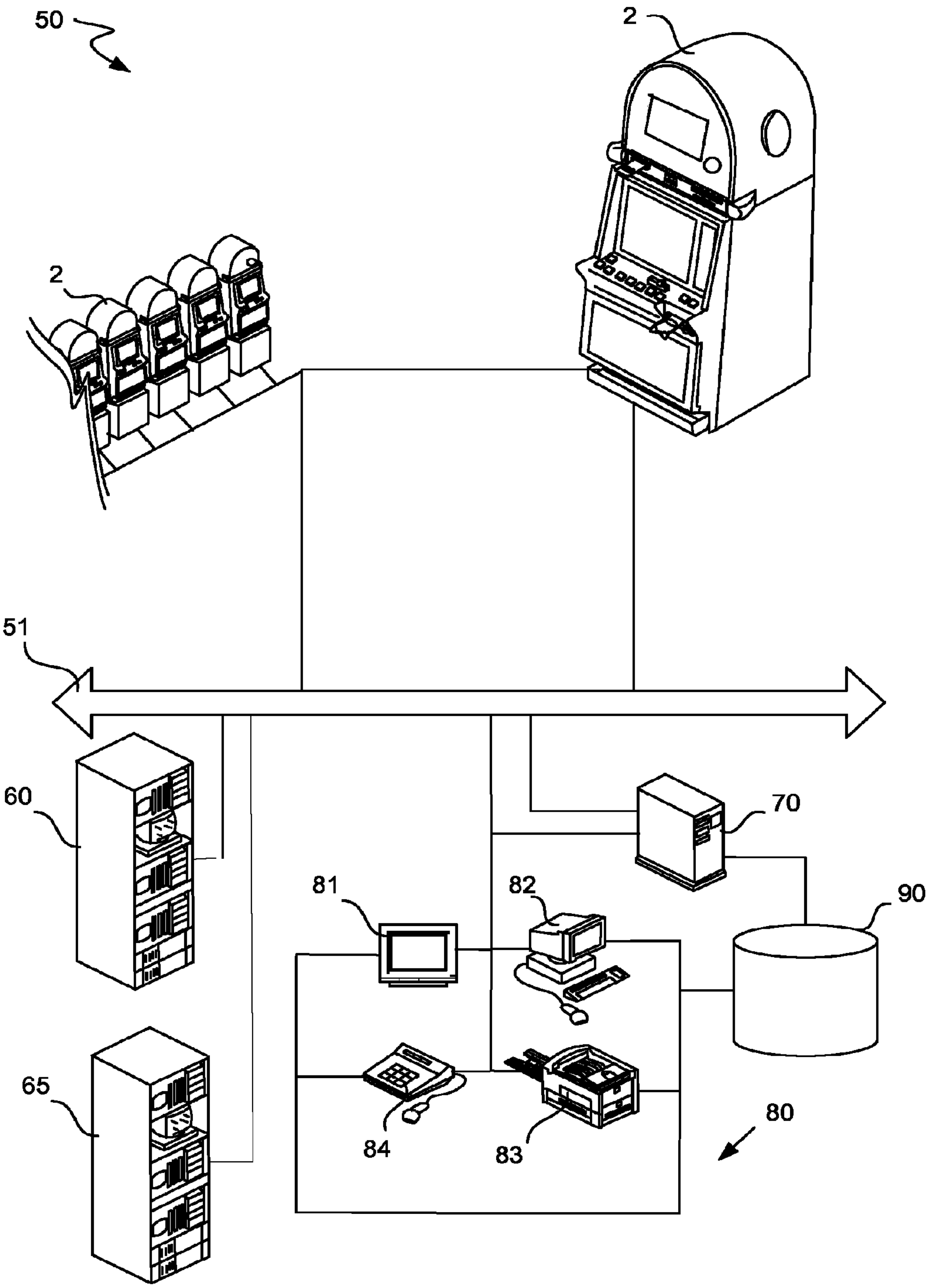
FIG. 3A is a diagram of an embodiment of a central determination gaming system.

FIG. 3A is a view of an exemplary network infrastructure for providing a central determination gaming system. Exemplary central determination gaming system 50 has gaming machines, various communication links, and a number of host-side components and devices adapted for use within a gaming environment. As shown, gaming machines 2 adapted for use in central determination gaming system 50 can be in a plurality of locations, such as in banks on a casino floor or standing alone at a smaller non-gaming establishment, as desired. Common bus 51 can connect one or more gaming machines or devices to a number of networked devices on the central determination gaming system 50, such as, for example, a central server 65, a general-purpose server 60, one or more special-purpose servers 70, a sub-network of peripheral devices 80, and/or a database 90.

A central server 65 may be one that is present within a casino or other establishment. Central server 65 provides for the distribution of game outcomes or sends these game outcomes among the gaming machines 2. The game outcomes distributed in accordance with different embodiments are game outcomes for any of a variety of games, that is, game applications which can be played using embodiments disclosed herein. For example, in one instance, each of the game outcomes includes an award amount for the particular game or sub-games being played. In some embodiments, the sub-games outcomes include progressive prizes or progressive bonuses.

Figure 3B:
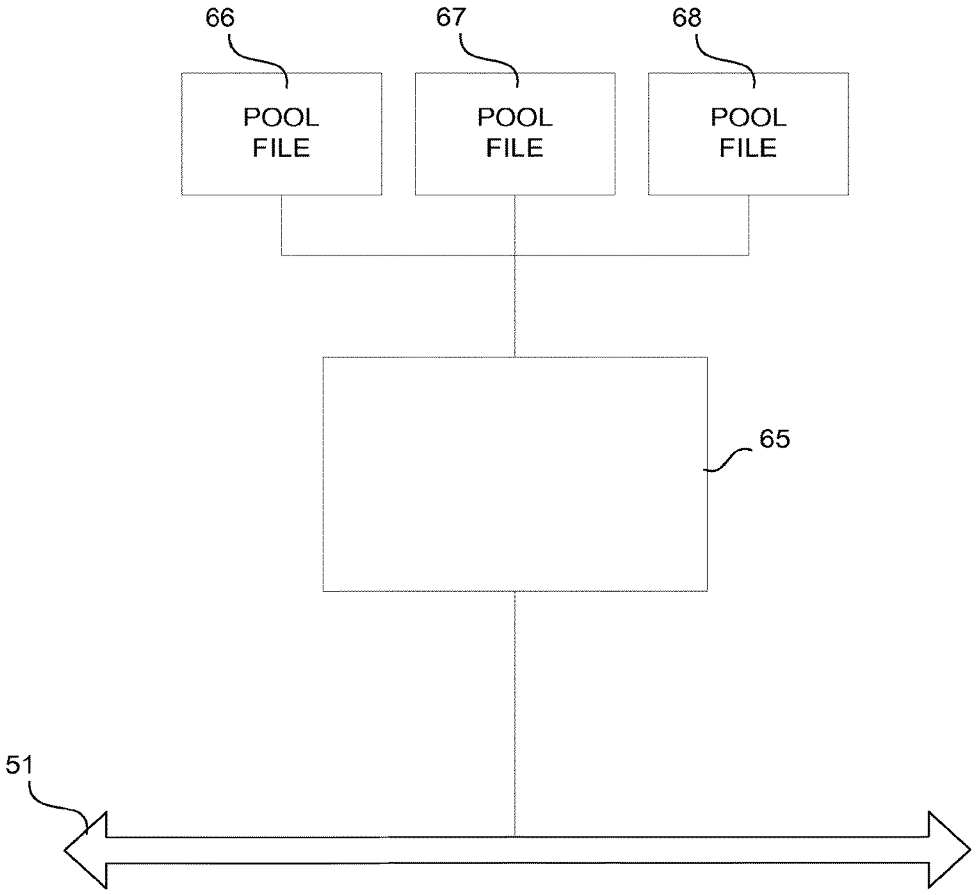
FIG. 3B is a diagram of an embodiment of a central server and associated pool files.

In some embodiments, the games outcomes are stored in finite pools of outcomes in a storage medium associated with central server 65, as shown in FIG. 3B. Pool files 66, 67, and 68 may be stored in storage mediums on the central server 65 or located remotely from central server 65. For example, the storage mediums may be suitable memory devices or databases. Central server 65 is configured to distribute some or all of the outcomes from the finite pools of game outcomes stored in a pool file to the gaming machines. The gaming machines 2 are configured to receive these distributed game outcomes. In further embodiments, central server 65 is configured to track the outcomes distributed from the finite pool to the gaming machines and the outcomes remaining in the finite pool. Again, central determination gaming is described further in U.S. patent application Ser. No. 11/109,527, filed Apr. 18, 2005.

Returning to FIG. 3A, a general-purpose server 60 may be one that is already present within a casino or other establishment for one or more other purposes beyond any monitoring or administering involving gaming machines. Functions for such a general-purpose server can include other general and game specific accounting functions, payroll functions, general Internet and e-mail capabilities, switch board communications, and reservations and other hotel and restaurant operations, as well as other assorted general establishment record keeping and operations. In some cases, specific gaming related functions such as cashless gaming, downloadable gaming, player tracking, remote game administration, video or other data transmission, or other types of functions may also be associated with or performed by such a general-purpose server. For example, such a server may contain various programs related to cashless gaming administration, player tracking operations, specific player account administration, remote game play administration, remote game player verification, remote gaming administration, downloadable gaming administration, and/or visual image or video data storage, transfer and distribution, and may also be linked to one or more gaming machines, in some cases forming a network that includes all or many of the gaming devices and/or machines within the establishment. Communications can then be exchanged from each adapted gaming machine to one or more related programs or modules on the general-purpose server.

In one embodiment, central determination gaming system 50 contains one or more special-purpose servers that can be used for various functions relating to the provision of cashless gaming and gaming machine administration and operation under the present methods and systems. Such a special-purpose server or servers could include, for example, a cashless gaming server, a player verification server, a general game server, a downloadable games server, a specialized accounting server, and/or a visual image or video distribution server, among others. Of course, these functions may all be combined onto a single specialized server. Such additional special-purpose servers are desirable for a variety of reasons, such as, for example, to lessen the burden on an existing general-purpose server or to isolate or wall off some or all gaming machine administration and operations data and functions from the general-purpose server and thereby increase security and limit the possible modes of access to such operations and information.

Alternatively, central determination gaming system 50 can be isolated from any other network at the establishment, except for the central server 65, such that a general-purpose server 60 is essentially impractical and unnecessary. Under either embodiment of an isolated or shared network, one or more of the special-purpose servers are preferably connected to sub-network 80, which might be, for example, a cashier station or terminal. Peripheral devices in this sub-network may include, for example, one or more video displays 81, one or more user terminals 82, one or more printers 83, and one or more other input devices 84, such as a ticket validator or other security identifier, among others. Similarly, under either embodiment of an isolated or shared network, at least the specialized server 70 or another similar component within a general-purpose server 60 also preferably includes a connection to a database or other suitable storage medium 90. Database 90 is preferably adapted to store many or all files containing pertinent data or information for a particular purpose, such as, for example, data regarding visual image data, video clips, other displayable items, and/or related data, among other potential items. Files, data and other information on database 90 can be stored for backup purposes, and are preferably accessible at one or more system locations, such as at a general-purpose server 60, a special purpose server 70 and/or a cashier station or other sub-network location 80, as desired.

While central determination gaming system 50 can be a system that is specially designed and created new for use in a casino or gaming establishment, it is also possible that many items in this system can be taken or adopted from an existing gaming system. For example, central determination gaming system 50 could represent an existing central determination gaming system to which one or more of the inventive methods are implemented. In addition to new methods, new functionality via new software, modules, updates or otherwise can be provided to an existing database 90, specialized server 70, central server 65, and/or general-purpose server 60, as desired. Other modifications to an existing system may also be necessary, as might be readily appreciated.

A central determination gaming system can operate in a number of different manners. Generally, in a central determination gaming system, a gaming machine requests a game outcome (also referred to as a game outcome register, herein) from a central server. The central server selects a game outcome from a finite pool of game outcomes in a pool file and communicates the game outcome to the gaming machine. The gaming machine then displays the game outcome to the player.

For example, a player playing a slot gaming machine in a central determination gaming system may place a wager on a game. The slot gaming machine receives a game outcome for the game from the central server. In this example, the game outcome is that the player wins $100. Then, the gaming machine would display a combination of slot reel positions corresponding to a win of $100 for the player.

A gaming machine operating in such a central determination gaming system first enrolls with an enrollment message in a central determination system pool with an associated pool file. The enrollment message includes bet information that may specify the game, the denomination, lines played, credits per line (or other analogous parameters in that game, such as cards or hands played), etc. Once enrolled in the central determination system pool, the gaming machine requests and receives game outcomes from the finite pool of game outcomes in the pool file.

In some embodiments of a central determination gaming system, a method of representing game outcomes uses seed values. A seed value is used to initialize a deterministic random number generator (RNG) so that the same seed value will produce the same sequence of random numbers every time. Those random numbers are known to produce a specific outcome in a game, such that a specific seed value is used to represent that specific outcome. For example, seed value X would always yield the same slot reel positions for a slot gaming machine.

In some current central determination gaming systems, after receiving an enrollment message that includes a wager, the central server sends a game outcome register to the gaming machine that includes a game identification, a seed value, and a win amount; i.e., <GAME ID><SEED VALUE><WIN AMOUNT>. The seed value is used to generate a game outcome of a single game.

One limitation of a central determination gaming system that represents outcomes using seed values in the manner described above is that each seed value does represent one and only one game outcome. In a central determination gaming system with a gaming machine having a base game and a bonus game, both the base game outcome and the bonus game outcome are generated from the single seed value. Similarly, with a multi-play gaming machine on which a number sub-games are being played, the outcomes for each of the sub-games are generated from the single seed value. In order to generate multiple game outcomes (i.e., a base game outcome and a bonus game outcome awarded as part of the base game or a game outcome for each of the sub-games) from a single seed value, the seed value is processed to generate random numbers as needed for displaying the game outcomes. Processing a seed value in this manner, however limits the number of different outcomes that will be displayed in the bonus game on a gaming machine or in the sub-games on a multi-play gaming machine, as described further herein.

Stated in a different manner, the problem caused by using one seed value to represent an entire game (here, an entire game being a base game outcome and a bonus game outcome awarded as part of the base game or a game outcome for each of the sub-games) is that it is difficult to find a seed value that hits each possible award or game outcome (e.g., a seed that hits the bonus and plays all free spins adequately in a bonus game awarded as part of a base game). As such, it is desirable to have one seed value for the base game and one seed value for each bonus game on a gaming machine or a seed value for each of the sub-games that are part of a multi-game.

For example, for a base game and a bonus game with a gaming machine, the base game outcome displayed on the gaming machine may be different for each game. However, with the processing of a seed value to generate the bonus game outcome, there may be only five different bonus games outcomes that are displayed. If a player saw the same bonus game outcome repeatedly displayed, this would arouse suspicion that the gaming machine was somehow not functioning properly. As another example, for four sub-games on a multi-play gaming machine, the first sub-game outcome displayed may be different each time. However, with the processing of a seed value to generate the three other sub-game outcomes, there may be a limited number of different sub-game outcomes that are displayed for the three remaining sub-games.

One way of generating multiple game outcomes for an entire game (again, an entire game being a base game outcome and a bonus game outcome awarded as part of the base game or a game outcome for each of the sub-games) would be for the gaming machine or multi-play gaming machine to send an enrollment message for each game that is played (i.e., the base game and bonus game or each of the sub-games). Each enrollment message sent by the gaming machine, however, would be accounted for as an individual game, rather than as one single multi-game transaction. Also, a gaming machine is often required to verify the amount won in a game, be it a single game or a single multi-game, with the central server of the central determination gaming system, and the amount won cannot be verified until the game is complete. A central determination gaming system may not tolerate sending multiple game outcomes to a gaming machine before receiving verification of all pay amounts.

For these reasons, it is desirable to have all of the sub-games played in a game transaction on a multi-play gaming machine accounted for as a single game. For example, if a player opts to play three sub-games in one game transaction, it is desirable to have all three sub-games accounted for as single multi-play game. It is also desirable to have the base game and the bonus game played on a gaming machine accounted for as a single game.

Using a multi-play gaming machine in a central determination gaming system as an example, it desirable to receive at the multi-play gaming machine from the central sever a game outcome register that includes a seed value for each sub-game to be displayed as part of a game transaction; i.e., <GAME ID 1><SEED VALUE 1><WIN AMOUNT 1><GAME ID 2><SEED VALUE 2><WIN AMOUNT 2> . . . <GAME ID n><SEED VALUE n><WIN AMOUNT n>, where n is the total number of sub-games to be displayed. Note that Game IDs may specify different games, or may specify different stages within the same game. With a multi-play gaming machine enrolling in a pool file and requesting a game outcome register, the central server can account for a game transaction that includes a number of sub-games as a single game transaction, accurately reflecting the actual play.

Figure 4A:
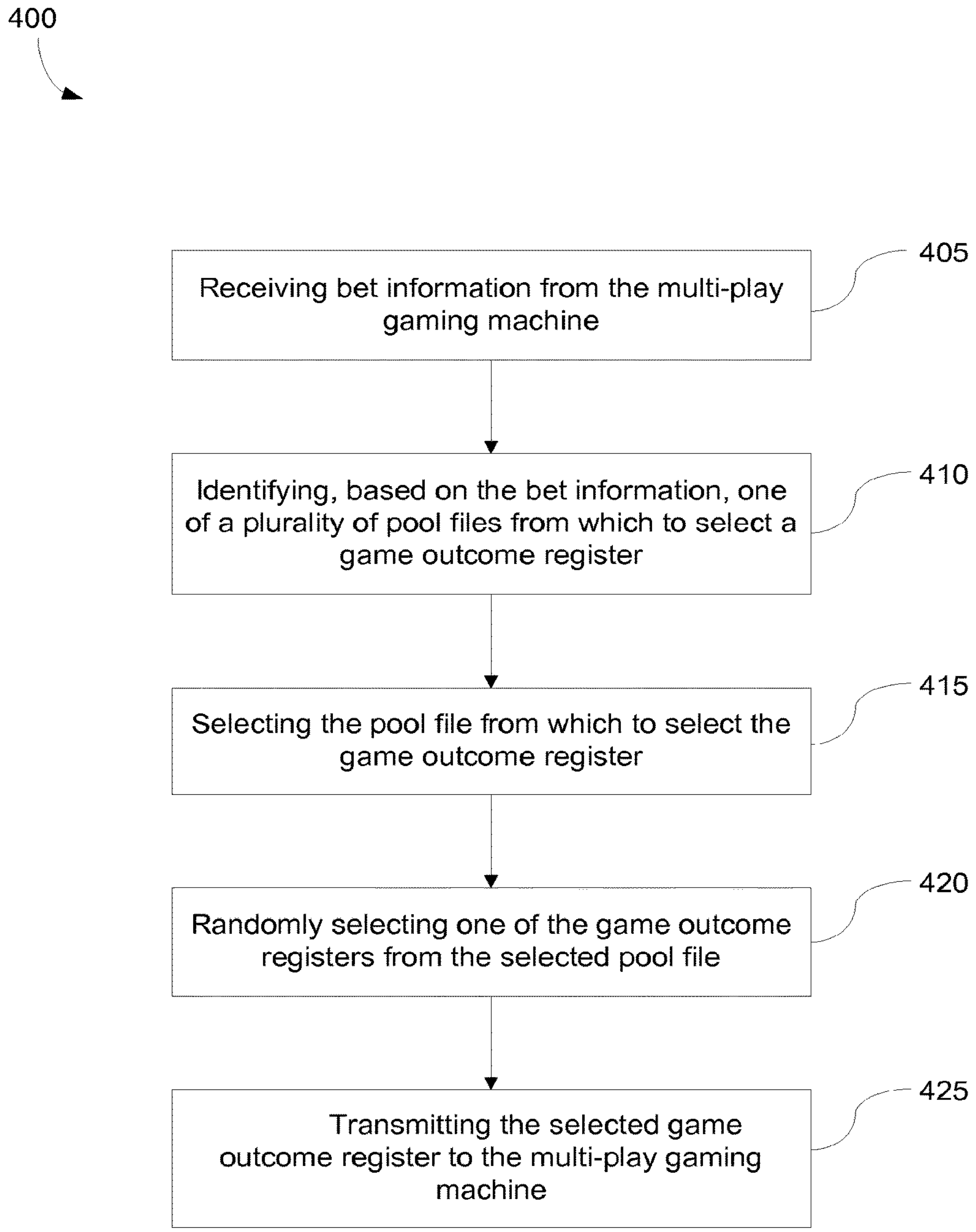
FIG. 4A is a flow diagram for a method of presenting one or more sub-games on a multi-play gaming machine that is part of a central determination gaming system according to one embodiment.

FIG. 4A is a flow diagram for a method of presenting one or more sub-games on a multi-play gaming machine that is part of a central determination gaming system according to one embodiment. In 405, a central server receives bet information from a multi-play gaming machine. The bet information may include, for example, a bet amount, a number of sub-games selected, and a number of lines bet in the selected number of sub-games. In 410, the central server identifies one of a plurality of pool files from which to select a game outcome register. The pool file is selected based on the bet information. For example, in some embodiments, there are different pool files for the different number of sub-games that are played; i.e., one pool file for when one sub-game is played, one pool file for when two sub-games are played, etc. In some embodiments, there are different pool files for different amounts wagered.

Figure 4B:
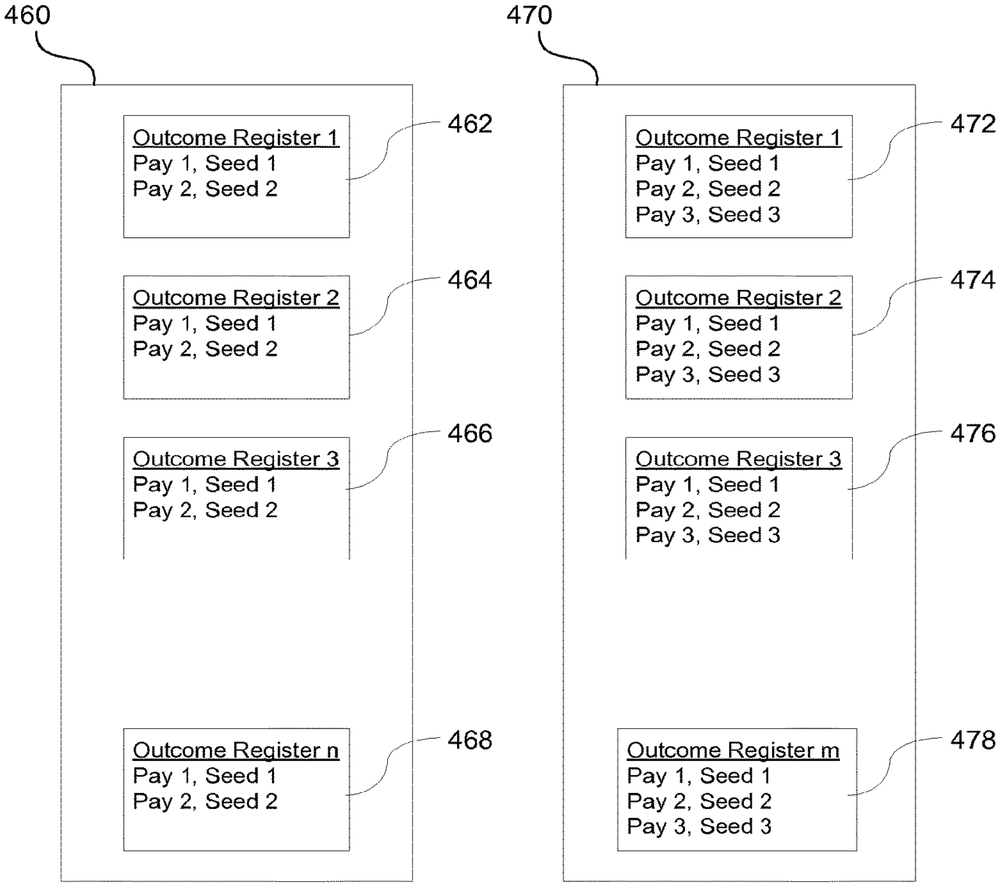
FIG. 4B is a diagram of an embodiment of two pool files configured to be used with the method of FIG. 4A.

Each pool file includes a plurality of game outcome registers. Two examples of embodiments of pool files are shown in FIG. 4B. A game outcome register is selected from pool file 460 when two sub-games are played, and a game outcome register is selected from pool file 470 when three sub-games are played. As noted herein, there may be many other pool files from which the central server selects a game outcome register.

As also shown in FIG. 4B, each game outcome register in the pool file includes one or more sub-game outcomes. The game outcome registers 462, 464, 466, and 468 in pool file 460 include two sub-game outcomes. The sub-game outcomes include a sub-game payout and a seed value. Similarly, the game outcome registers 472, 474, 476, and 478 include three sub-game outcomes. The number of game outcome registers in each pool file is finite; i.e., 1 though n game outcome registers are in pool file 460 and 1 though m game outcome registers are in pool file 470.

In some embodiments, when the sub-game payout in a sub-game outcome is zero (i.e., the player does not win anything in that sub-game), the seed value in the sub-game outcome includes a zero value. With a zero value in the sub-game outcome, the multi-play gaming machine receiving the game outcome register will generate a random loosing outcome for that sub-game to be displayed to the player. In further embodiments, when the sub-game payout in a sub-game outcome is not zero, the seed value in the sub-game outcome includes a 32-bit number. This seed value is used by the multi-play gaming machine to determine an outcome to be displayed for the sub-game, as described herein.

In 415, the central server selects the pool file from which to select a game outcome register. In 420, the central server randomly selects one of the game outcome registers from the selected pool file. In some embodiments, after selecting a game outcome register, the central server designates the selected game outcome register as used. By a game outcome register being designated as used, the central server will not select the used game outcome register again in a subsequent game transaction. In further embodiments, the pool file is retired when a certain percentage of the game outcome registers in the pool file are designated as used. When a pool file is retired, a new pool file, corresponding to the same bet information, takes its place. The new pool file may have a full distribution of game outcome registers; i.e., none of the game outcome registers are designed as used.

In 425, the selected game outcome register is transmitted to the multi-play gaming machine. The multi-play gaming machine uses the information in the game outcome register to determine the outcomes to be displayed for each sub-game of the multi-play game. That is, the controller of the multi-play gaming machine is configured to determine a sub-game output to be displayed for each sub-game outcome in the selected game outcome register using the seed value in each sub-game outcome.

In some embodiments, the payout percentage of at least one sub-game of the multi-play game is different from the pay-out percentages of the other sub-games. A payout percentage, also referred to as the payback percentage, is the percent of each dollar played in a video or slot machine that the machine is programmed to return to the player. Payout percentage is 100 percent minus the house edge.

Such an embodiment (i.e., when the payout percentage of at least one sub-game of the multi-play game is different from the pay-out percentages of the other sub-games) might be used to encourage players to wager larger amounts of money. For example, a multi-play gaming machine may be set-up so that a wager up to a certain value plays one sub-game, a wager up to a higher value plays two sub-games, a wager up to even a higher value plays three sub-games, and so on. The later sub-games (i.e., the third or forth sub-game) may have higher pay-out percentages. By playing the later sub-games, which require a higher wager, the player has a better chance of winning.

Figure 5A:
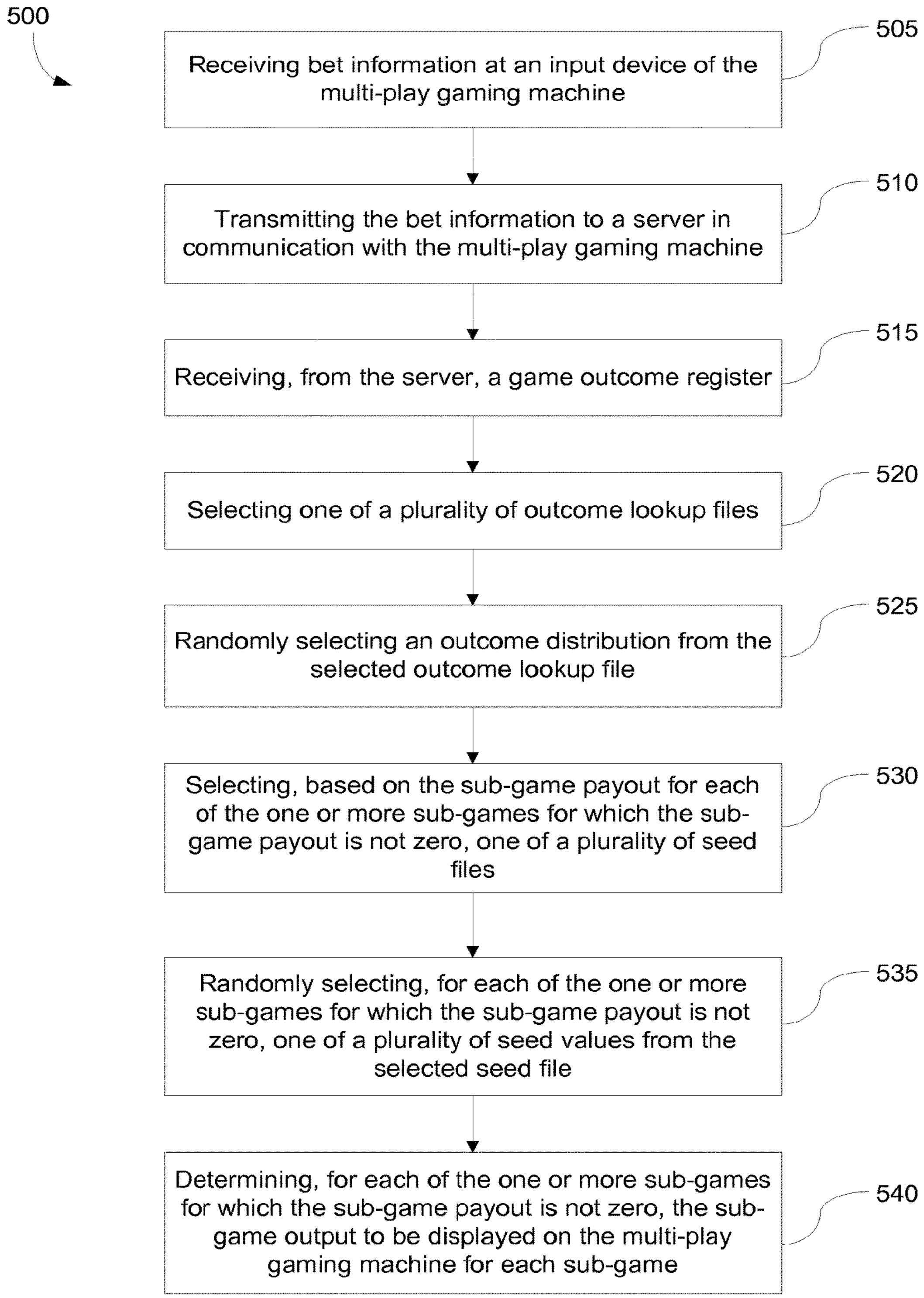
FIG. 5A is a flow diagram for a method of presenting one or more sub-games on a multi-play gaming machine that is part of a central determination gaming system according to one embodiment.

FIG. 5A is a flow diagram for a method of presenting one or more sub-games on a multi-play gaming machine that is part of a central determination gaming system according to one embodiment. In this embodiment, the game outcome register in a pool file includes a payout amount, but does not include seed values for each of the sub-games. Instead, the multi-play gaming machine determines the seed values for each of the sub-games, as described further herein. This embodiment, in some instances, may be more readily adaptable to current central determination gaming systems that are not configured to provide the game outcome registers that were described in relation to FIGS. 4A and 4B.

In 505, a multi-play gaming machine receives bet information at an input device of the multi-play gaming machine. The bet information may include a bet amount. In further embodiments, the bet information also includes a number of sub-games selected or a number of lines bet in the selected number of sub-games. In 510, the multi-play gaming machine transmits the bet information to a server.

Figure 5B:
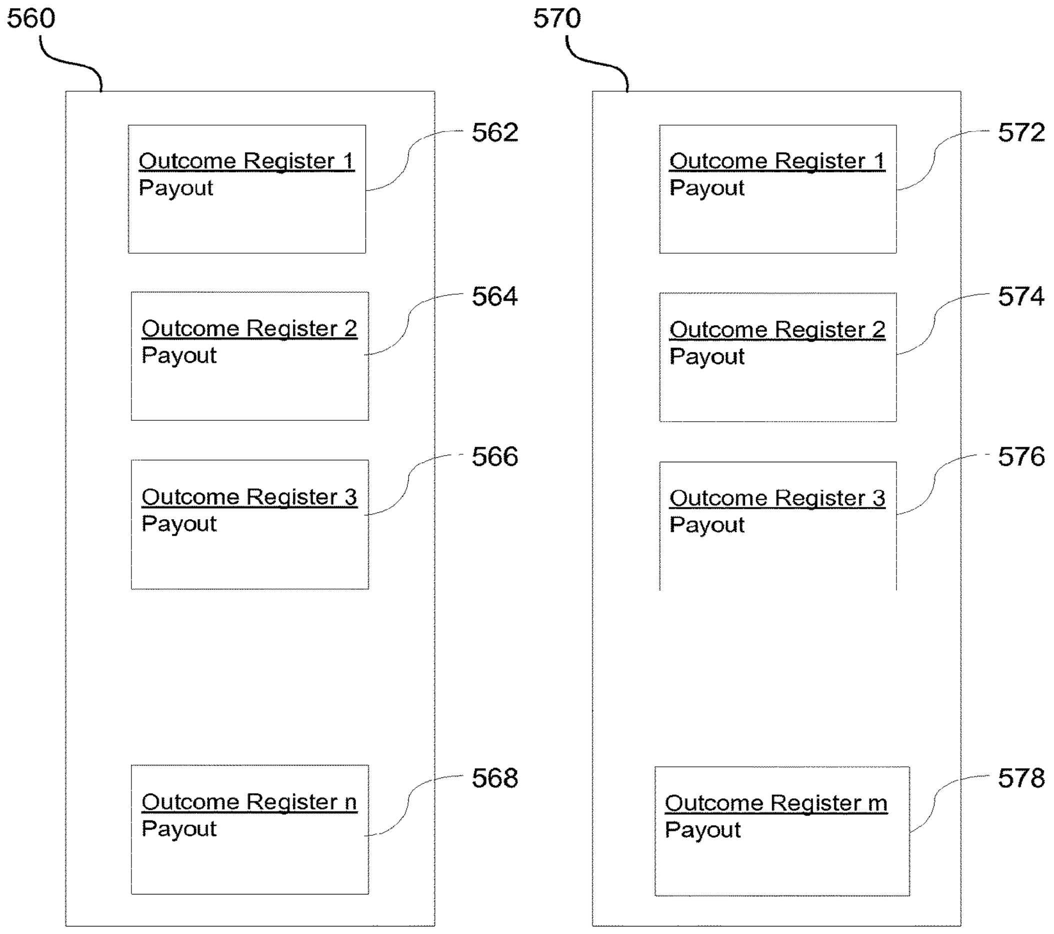
FIG. 5B is a diagram of an embodiment of two pool files configured to be used with the method of FIG. 5A.

The server, based on the bet information, selects a pool file. For example, one pool file may exist for wagers of $100, another pool file for wagers of $150, and so on. Each pool file includes a plurality of game outcome registers. Two examples of embodiments of pool files are shown in FIG. 5B. A game outcome register is randomly selected from pool file 560 for one wager amount, and a game outcome register is selected from pool file 570 for another wager amount. As noted herein, there may be many other pool files from which the server selects a game outcome register. In some embodiments, after selecting a game outcome register, the server designates the selected game outcome register as used. By a game outcome register being designated as used, the server will not select the used game outcome register again in a subsequent game transaction. In further embodiments, the pool file is retired when a certain percentage of the game outcome registers in the pool file are designated as used. When a pool file is retired, a new pool file, corresponding to the same bet information, takes its place. The new pool file may have a full distribution of game outcome registers; i.e., none of the game outcome registers are designated as used.

As also shown in FIG. 5B, each game outcome register in the pool file includes a payout. The game outcome registers 562, 564, 566, and 568 in pool file 560 each include a payout. Similarly, the game outcome registers 572, 574, 576, and 578 each include a payout. The number of game outcome registers in each pool file is finite; i.e., 1 though n game outcome registers are in pool file 560 and 1 though m game outcome registers are in pool file 570. Further, in some embodiments, the game outcome registers are weighted differently such that there is a greater chance of the server randomly selecting one game outcome register over another game outcome register.

Returning to FIG. 5A, in 515, the multi-play gaming machine receives the game outcome register that was selected by the server. In 520, the multi-play gaming machine selects one of a plurality of outcome lookup files. The outcome lookup files may be stored in a storage medium or mediums located locally on the multi-play gaming machine, for example. Alternatively, the outcome lookup files may be stored in a storage medium or mediums located remotely on another server associated with the central determination gaming system.

Figure 5C:
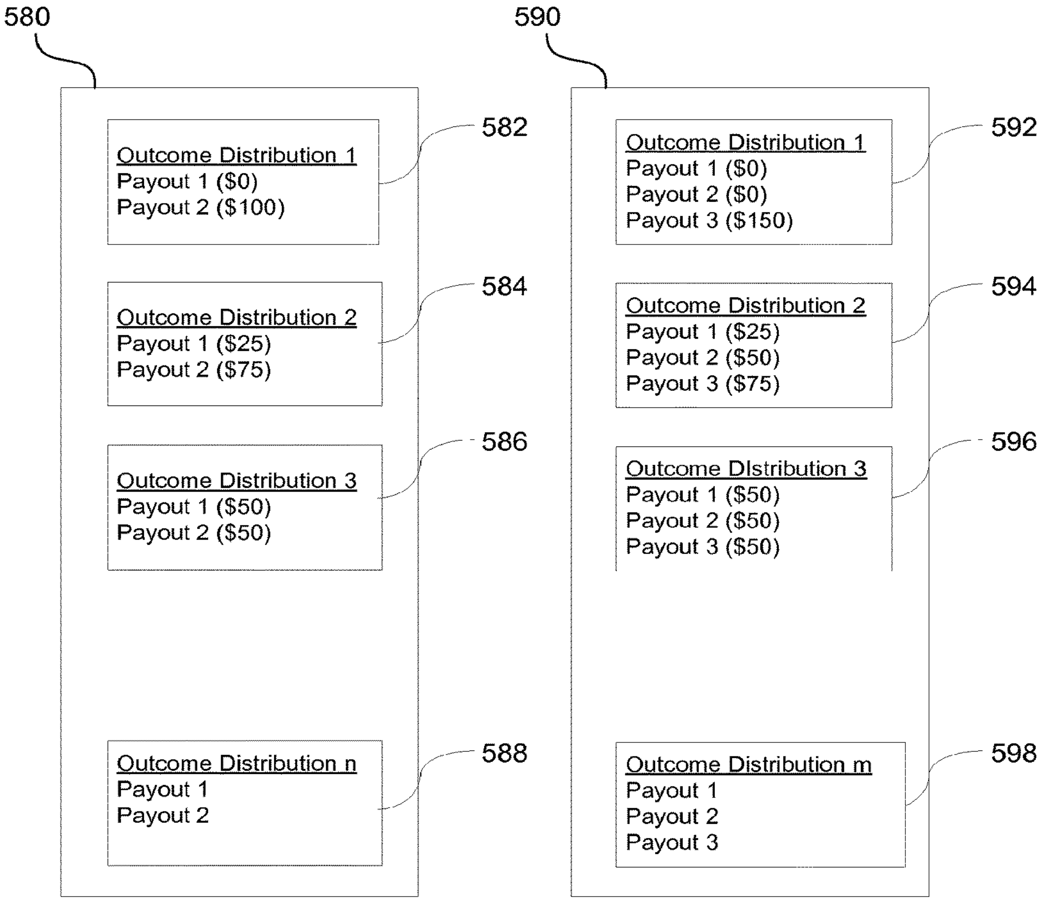
FIG. 5C is a diagram of an embodiment of two outcome lookup files configured to be used with the method of FIG. 5A.

The multi-play gaming machine selects the outcome lookup file based in part on the number of sub-games being played on the multi-play gaming machine. In other embodiments, the outcome lookup file is selected based on the payout in the game outcome register. Each outcome lookup file includes a plurality outcome distributions. Two examples of embodiments of outcome lookup files are shown in FIG. 5C. When there is a payout of $100 in the game outcome register when two sub-games are being played, the multi-play gaming machine selects outcome lookup file 580. When there is a payout of $150 in the game outcome register when three sub-games are being played, the multi-play gaming machine selects outcome lookup file 590.

Returning to FIG. 5A, in 525, the multi-play gaming machine randomly selects an outcome distribution from the selected outcome lookup file. An outcome distribution specifies how the payout is to be allocated into sub-game payouts, with each sub-game payout being associated with each of the sub-games being played. For example, when there is a payout of $100 when two sub-games are being played, the multi-play gaming machine randomly selects an outcome distribution 582, 584, 586, or 588 from outcome lookup file 580. Outcome distributions 582, 584, 586, and 588 are different manners of dividing $100 between two sub-games. There may a number of different outcome distributions. When there is a payout of $150 when three sub-games are being played, the multi-play gaming machine randomly selects an outcome distribution 592, 594, 596, or 598 from outcome lookup file 590. The number of outcome distributions in each outcome distribution file may be finite; i.e., 1 though n outcome distributions may be in outcome distribution file 580 and 1 though m outcome distributions may be in outcome distribution file 590. Further, in some embodiments, different outcome distributions are weighted differently such that there is a greater chance of the multi-play gaming machine randomly selecting one outcome distribution over another outcome distribution. For example, outcome distribution 586 may be weighted such that it is more likely to be selected by the multi-play gaming machine than outcome distribution 582. In some embodiments, this weighting may be based on a distribution of outcomes from a Class III game paytable that the multi-play gaming machine is simulating.

In 530, the multi-play gaming machine selects one of a plurality of seed files. The seed files may be stored in a storage medium or mediums located locally on the multi-play gaming machine, for example. Alternatively, the seed files may be stored in a storage medium or mediums located remotely on another server associated with the central determination gaming system. In other embodiments, there is one seed file; a seed is selected from the seed file based on the sub-game payout. In further embodiments, there is one seed file associated with each sub-game that is played; a seed is selected from the seed file based on the sub-game payout.

Figure 5D:
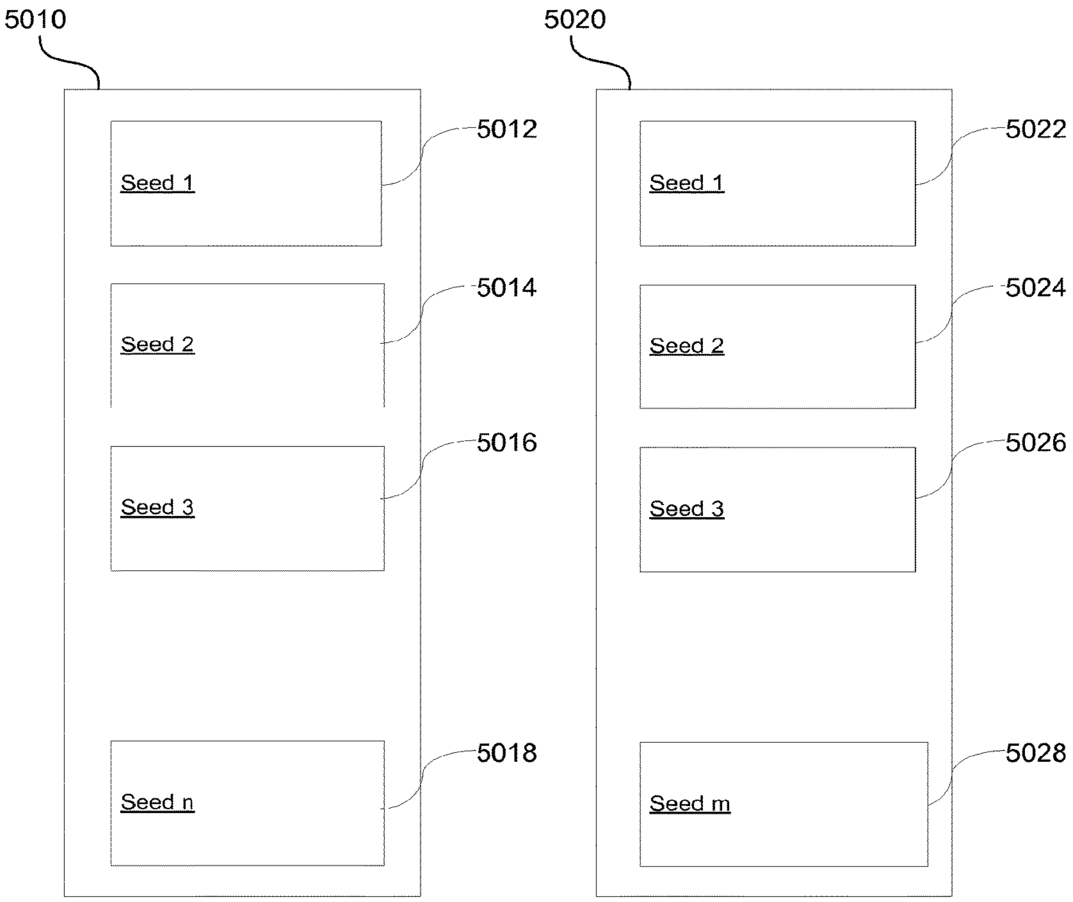
FIG. 5D is a diagram of an embodiment of two seed files configured to be used with the method of FIG. 5A.

The multi-play gaming machine selects the seed file based on the sub-game payout for each of the one or more sub-games for which the sub-game payout is not zero, as specified by the outcome distribution. Each seed file includes a plurality seed values. Two examples of embodiments of seed files are shown in FIG. 5D. For example, when the sub-game payout is $50, seed file 5010, corresponding to a sub-game payout of $50, may be selected. When the sub-game payout is $100, seed file 5020, corresponding to a sub-game payout of $100, may be selected. In some embodiments, the number of seed values in each seed file is finite; i.e., 1 though n seed values are in seed file 5010 and 1 though m seeds are in seed file 590.

Returning to FIG. 5A, in 535, the multi-play gaming machine randomly selects a seed value from the selected seed file for each of the one or more sub-games for which the sub-game payout is not zero. In 540, each selected seed value is used to determine an output to be displayed on the multi-play gaming machine for each of the one or more sub-games for which the sub-game payout is not zero, For example, when the sub-game payout is $50, a seed value 5012, 5014, 5016, or 5018 may be selected from seed file 5010. When the sub-game payout is $100, a seed value 5022, 5024, 5026, or 5028 may be selected from seed file 5020. In some embodiments, the seed values in the seed file are weighted differently, such that there is a greater chance of the multi-play gaming machine randomly selecting one seed value over another seed value. For example, a seed value that generates an output that is more likely to occur in a Class III game may be weighted such that the seed value is more often selected over a seed value that generates an output that is less likely to occur in a Class III game.

In some embodiments, when the payout in a sub-game is zero, the multi-play gaming machine generates a random loosing outcome for that sub-game to be displayed to the player.

In some embodiments, at least one sub-game has a better chance of a payout than other sub-games. This can be implemented by modifying outcome distributions in an outcome lookup file. For example, when four sub-games are played and the server has selected a game outcome register with a payout, the outcome distributions in the selected outcome lookup file may have the fourth sub-game payout generally larger than the other sub-game payouts.

In some embodiments, the outcome distribution further specifies that a bonus game is associated with the one or more sub-games. For example, a bonus game might be associated with four sub-games that are played. For the bonus game, the multi-play gaming machine randomly selects one of a plurality of bonus seed values from a bonus seed file. The bonus seed value is used to determine an output to be displayed for the bonus game. In some embodiments, the bonus game is played as a single sub-game. In other embodiments, the bonus game is played across all of the sub-games; for example, if there are four sub-games on a multi-play gaming machine, with each sub-game having five reels (in the instance of a slot machine type multi-play gaming machine), all twenty reels could be used for the output to be displayed for the bonus game.

FIG. 6 is a flow diagram for a method of presenting a first game and a second game on a gaming machine that is part of a central determination gaming system according to one embodiment. This method is similar to the method described with reference to FIG. 4A.

In 605, a gaming machine configured to present a first game and a second game receives bet information at an input device of the gaming machine. In some embodiments, the second game is a bonus game. In some embodiments, the bet information includes a bet amount. In 610, the gaming machine transmits the bet information to a server.

The server, based on the bet information, selects a pool file based on the bet information. For example, one pool file may exist for wagers of $100, another pool file for wagers of $150, and so on. Each pool file includes a plurality of game outcome registers. Two examples of embodiments of pool files are shown in FIG. 6B. A game outcome register is randomly selected from pool file 660 for one wager amount, and a game outcome register is selected from pool file 670 for another wager amount. As noted herein, there may be many other pool files from which the central server selects a game outcome register. In some embodiments, after selecting a game outcome register, the server designates the selected game outcome register as used. By a game outcome register being designated as used, the server will not select the used game outcome register again in a subsequent game transaction. In further embodiments, the pool file is retired when a certain percentage of the game outcome registers in the pool file are designated as used. When a pool file is retired, a new pool file, corresponding to the same bet information, takes its place. The new pool file may have a full distribution of game outcome registers; i.e., none of the game outcome registers are designated as used.

As also shown in FIG. 6B, each game outcome register in the pool file includes one or more game outcomes. The game outcome registers 662, 664, 666, and 668 in pool file 660 and the game outcome registers 672, 674, 676, and 678 in pool file 670 include two game outcomes. The game outcomes include a game payout and a seed value. The number of game outcome registers in each pool file is finite; i.e., 1 though n game outcome registers are in pool file 660 and 1 though m game outcome registers are in pool file 670.

Returning to FIG. 6A, in 615, the gaming machine receives the game outcome register that was selected by the server. In 620, the gaming machine determines a first game output to be displayed on the gaming machine for the first game. This is done using the first seed value. In 625, the gaming machine determines a second game output to be displayed on the gaming machine for the second game. This is done using the second seed value.

In some embodiments, the game outcome register further includes a third payout and an associated third seed value. The gaming machine also determines a third game output to be displayed on the gaming machine for the third game using the third seed value.

Figure 6A:
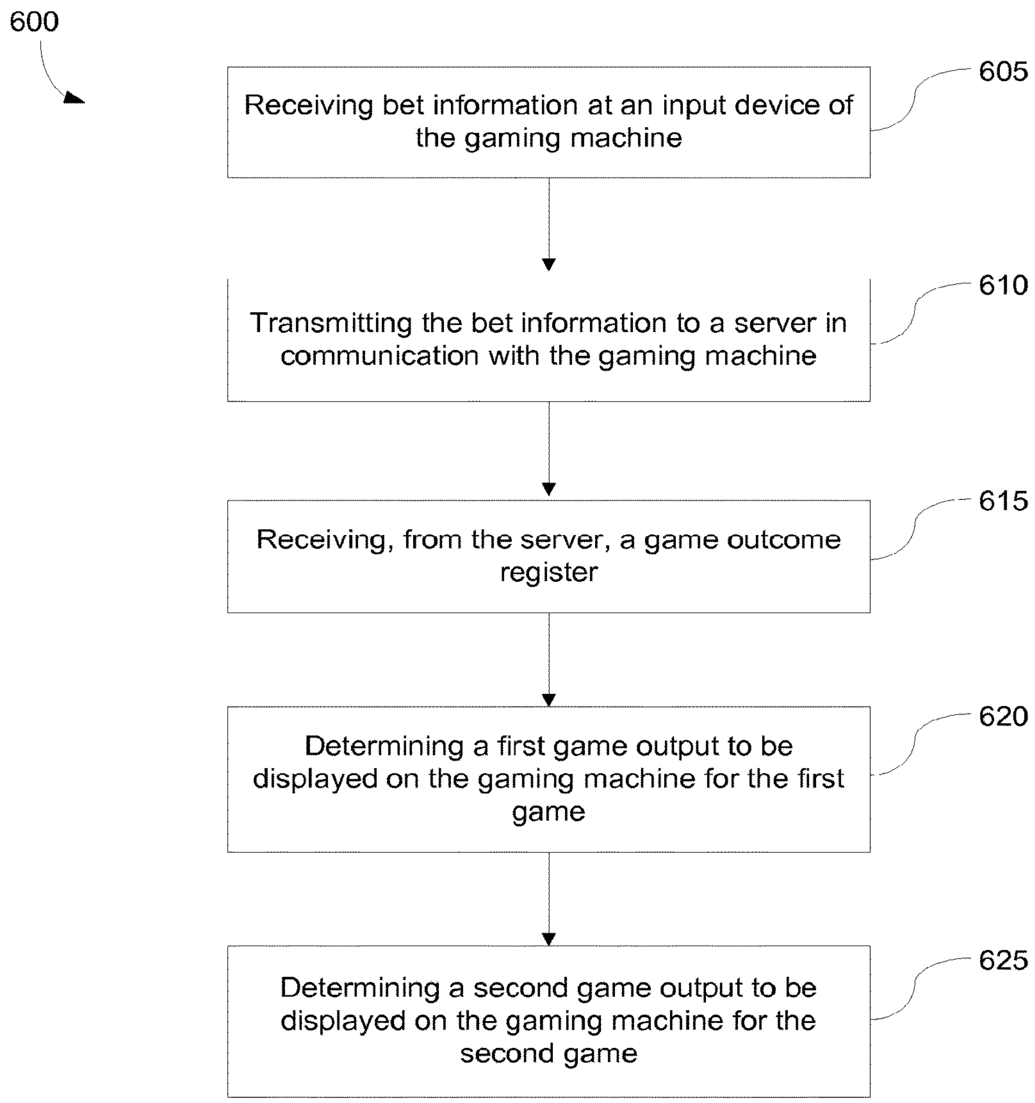
FIG. 6A is a flow diagram for a method of presenting a first game and a second game on a gaming machine that is part of a central determination gaming system according to one embodiment.
Figure 6B:
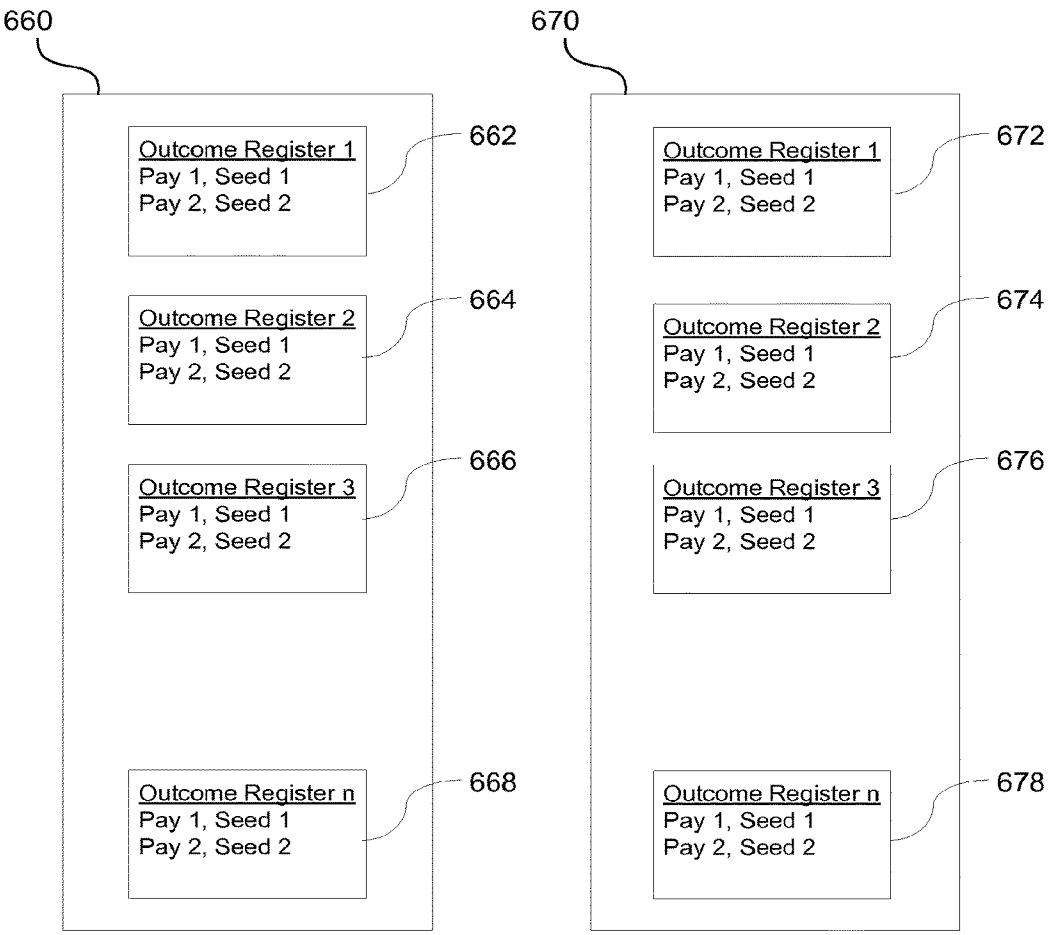
FIG. 6B is a diagram of an embodiment of two pool files configured to be used with the method of FIG. 6A.

In some embodiments, there is not a second or third game associated with the base game in the method described in FIG. 6A. When there is not a second or third game associate with the base game, the server randomly selects an outcome register from a pool file in which the outcome registers include one game outcome, with one game payout and one seed value.

The methods described herein may be implemented with central determination gaming systems with multi-play gaming machines and/or gaming machines with a base game and a bonus game.

Although the foregoing present invention has been described in detail by way of illustration and example for purposes of clarity and understanding, it will be recognized that the above described present invention may be embodied in numerous other specific variations and embodiments without departing from the spirit or essential characteristics of the present invention. Certain changes and modifications may be practiced, and it is understood that the present invention is not to be limited by the foregoing details, but rather is to be defined by the scope of the appended claims.

The invention is claimed as follows:

1. A gaming system comprising:

a housing;

at least one display device supported by the housing;

a plurality of input devices supported by the housing, said plurality of input devices including:

an acceptor of a first physical item associated with a first monetary value, and a cashout device configured to receive an input to cause an initiation of a payout associated with a credit balance;

at least one processor; and at least one memory device which stores a plurality of instructions, which when executed by the at least one processor, cause the at least one processor to:

for each of a quantity of at least two overlapping game plays:

receive, via at least one of the input devices, an input associated with a placement of a wager on said overlapping game play, cause the at least one display device to display a predetermined game outcome selected from a pool of predetermined game outcomes, said pool of predetermined game outcomes being based, at least in part, on the quantity of at least two overlapping game plays, and cause the at least one display device to display any award associated with the displayed predetermined game outcome, and transmit to an accounting server data associated with at least one of: the selected predetermined game outcomes and any awards associated with the selected predetermined game outcomes, wherein the quantity of at least two overlapping game plays are accounted for as a single game play.

2. The gaming system of claim 1, wherein a first quantity of at least two overlapping game plays is associated with a first pool of predetermined game outcomes and a second, different quantity of at least two overlapping game plays is associated with a second, different pool of predetermined game outcomes.

3. The gaming system of claim 1, wherein when executed by the at least one processor, the plurality of instructions cause the at least one processor to cause the at least one display device to simultaneously display each of the quantity of at least two overlapping game plays.

4. The gaming system of claim 1, wherein each of the predetermined game outcomes are associated with a distinct seed value.

5. The gaming system of claim 1, wherein said pool of predetermined game outcomes is based, at least in part, on an amount of the wagers placed on the quantity of at least two overlapping game plays.

6. The gaming system of claim 1, wherein for the quantity of at least two overlapping game plays, the predetermined game outcome is communicated from a controller.

7. The gaming system of claim 6, wherein for the quantity of at least two overlapping game plays, the selected predetermined game outcome is flagged by the controller and prevented from being subsequently selected.

8. A method of operating a gaming system, said method comprising:

maintaining a credit balance, said credit balance being increasable via an acceptor of a first physical item associated with a first monetary value, and decreasable via a cashout device configured to receive an input to cause an initiation of a payout associated with the credit balance;

for each of a quantity of at least two overlapping game plays:

receiving an input associated with a placement of a wager on said overlapping game play, said wager being deducted from the maintained credit balance, displaying, by at least one display device, a predetermined game outcome selected from a pool of predetermined game outcomes, said pool of predetermined game outcomes being based, at least in part, on the quantity of at least two overlapping game plays, and displaying, by the at least one display device, any award associated with the displayed predetermined game outcome, and transmitting to an accounting server data associated with at least one of: the selected predetermined game outcomes and any awards associated with the selected predetermined game outcomes, wherein the quantity of at least overlapping game plays are accounted for as a single game play.

9. The method of claim 8, wherein a first quantity of at least two overlapping game plays is associated with a first pool of predetermined game outcomes and a second, different quantity of at least two overlapping game plays is associated with a second, different pool of predetermined game outcomes.

10. The method of claim 8, further comprising simultaneously displaying, by the at least one display device each of the quantity of at least two overlapping game plays.

11. The method of claim 8, wherein each of the predetermined game outcomes are associated with a distinct seed value.

12. The method of claim 8, wherein said pool of predetermined game outcomes is based, at least in part, on an amount of the wagers placed on the quantity of at least two overlapping game plays.

13. The method of claim 8, wherein for the quantity of at least two overlapping game plays, the predetermined game outcome is communicated from a controller.

14. The method of claim 13, wherein for the quantity of at least two overlapping game plays, the selected predetermined game outcome is flagged by the controller and prevented from being subsequently selected.

15. The method of claim 13, which is provided through a data network.

16. The method of claim 15, wherein the data network is an internet.

* * * * *